(12) United States Patent
Rehmet et al.

(10) Patent No.: US 11,820,265 B2
(45) Date of Patent: Nov. 21, 2023

(54) VEHICLE SEAT

(71) Applicant: Brose Fahrzeugteile SE & Co. Kommanditgesellschaft, Coburg, Coburg (DE)

(72) Inventors: Fabian Rehmet, Lake Orion, MI (US); Philip Bartko, Macomb, MI (US)

(73) Assignee: Brose Fahrzeugteile SE & Co. Kommanditgesellschaft, Coburg, Coburg (DE)

( * ) Notice: Subject to any disclaimer, the term of this patent is extended or adjusted under 35 U.S.C. 154(b) by 70 days.

(21) Appl. No.: 17/591,665

(22) Filed: Feb. 3, 2022

(65) Prior Publication Data

US 2023/0242018 A1 Aug. 3, 2023

(51) Int. Cl.
| | |
|---|---|
| *B60N 2/30* | (2006.01) |
| *B60N 2/856* | (2018.01) |
| *B60N 2/005* | (2006.01) |
| *B60N 2/06* | (2006.01) |

(52) U.S. Cl.
CPC ........... *B60N 2/3047* (2013.01); *B60N 2/005* (2013.01); *B60N 2/06* (2013.01); *B60N 2/856* (2018.02)

(58) Field of Classification Search
CPC ...... B60N 2/3047; B60N 2/856; B60N 2/005; B60N 2/06
USPC .......................................................... 297/335
See application file for complete search history.

(56) References Cited

U.S. PATENT DOCUMENTS

| | | | |
|---|---|---|---|
| 3,376,587 A * | 4/1968 | Staron ..................... | B63B 29/04 |
| | | | 297/188.1 |
| 4,779,926 A * | 10/1988 | Maruyama ............... | B60N 2/32 |
| | | | 297/14 |
| 4,902,069 A * | 2/1990 | Lehnert ............... | B64D 11/0691 |
| | | | 297/14 |
| 8,823,756 B2 | 9/2014 | Hoffmann et al. | |
| 8,985,665 B2 | 3/2015 | Aschaber et al. | |
| 10,479,508 B2 * | 11/2019 | Joffre ................. | B64D 11/0691 |
| 10,807,720 B2 * | 10/2020 | Pacheco ............. | B64D 11/0698 |
| 2008/0224520 A1 * | 9/2008 | Veluswamy ........... | B60N 2/309 |
| | | | 297/335 |
| 2014/0319275 A1 * | 10/2014 | Najd .................... | B60N 2/3018 |
| | | | 297/14 |

FOREIGN PATENT DOCUMENTS

| | | |
|---|---|---|
| DE | 2107231 A1 | 8/1972 |
| DE | 102019202375 A1 | 8/2020 |
| EP | 2065250 B1 | 10/2018 |
| FR | 2663270 A1 | 12/1991 |
| FR | 2682334 A1 | 4/1993 |
| FR | 2923188 A1 | 5/2009 |

* cited by examiner

*Primary Examiner* — Mark R Wendell
(74) *Attorney, Agent, or Firm* — Dickinson Wright PLLC

(57) ABSTRACT

A seat for use in a vehicle, the seat configured to move between a use configuration and a non-use configuration, the seat comprising a guide member fixed to at least one of a floor of the vehicle or a wall of the vehicle, the guide member defining a guideway. A backrest configured to translate with respect to the guideway in a vertical direction, extending away from a floor of the vehicle, from a first position to a second position, and a cushion pan including a top surface and pivotally coupled to at least one of the backrest and the guide member, the cushion pan configured to pivot from a use position, in which the top surface is arranged to support an occupant seated in the seat, and a non-use position.

19 Claims, 5 Drawing Sheets

Fig-5
PRIOR ART

VEHICLE SEAT

TECHNICAL FIELD

The present disclosure relates to vehicle seats.

BACKGROUND

Vehicles generally include seats that may be moved between a use position and a non-use position, in which the seat is stowed or moved to a more compact configuration to provide additional storage space when the seat is not in use.

SUMMARY

According to one embodiment, a vehicle seat configured to move between a use configuration and a non-use configuration is provided. The seat may include a guide member, a backrest, and a cushion pan. The guide member may be fixed to at least one of a floor of the vehicle or a wall of the vehicle, and the guide member may define a guideway. The backrest may be configured to translate with respect to or along the guideway from a first position to a second position so that the backrest moves away from the floor of the vehicle. The cushion pan may include a first end portion and a second end portion, and the cushion pan may be configured to rotate between a horizontal position, in which the second end portion is spaced apart from the floor by a first distance, and a vertical position, in which the second end portion is spaced apart from the floor by a second distance that may be less than the first distance. The first end portion may be pivotally coupled to the backrest or the guide member so that as the backrest moves from the first position to the second position, the cushion pan rotates from the horizontal position to the vertical position to move the seat from the use configuration to the non-use configuration.

According to another embodiment, a vehicle seat configured to move between a use configuration and a non-use configuration is provided. The seat may include a guide member, a backrest, and a cushion pan. The guide member may be fixed to at least one of a floor of the vehicle or a wall of the vehicle, and the guide member may define a guideway. The backrest may be configured to translate with respect to or along the guideway in a vertical direction from a first position to a second position. The first direction may extend away from a floor of the vehicle. The cushion pan may include a top surface and may be pivotally to the backrest, the guide member, or both. The cushion pan may be configured to pivot from a use position, in which the top surface is arranged to support an occupant seated in the seat, and a non-use position.

According to yet another embodiment, a vehicle seat for use in a vehicle is provided. The vehicle includes a cabin that may be formed by a wall and a floor. The seat may include a base member, a backrest, and a cushion pan. The backrest may be coupled to the base member and configured to move with respect to the base member in a first direction and a second direction from a use position and a non-use position. The cushion pan includes a proximal end and a distal end, the proximal end may be coupled to the backrest and configured to move with the backrest in the first direction and the second direction. The second end may be configured to rotate towards the vehicle floor as the backrest moves from the use position to the non-use position.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

This invention is not limited to the specific embodiments and methods described below, as specific components and/or conditions may, of course, vary. Furthermore, the terminology used herein is used only for the purpose of describing particular embodiments of the present invention and is not intended to be limiting in any way.

As used in the specification and the appended claims, the singular form "a," "an," and "the" comprise plural referents unless the context clearly indicates otherwise. For example, reference to a component in the singular is intended to comprise a plurality of components.

The term "substantially" or "about" may be used herein to describe disclosed or claimed embodiments. The term "substantially" or "about" may modify a value or relative characteristic disclosed or claimed in the present disclosure. In such instances, "substantially" or "about" may signify that the value or relative characteristic it modifies is within ±0%, 0.1%, 0.5%, 1%, 2%, 3%, 4%, 5% or 10% of the value or relative characteristic.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). The term "and/or" includes any and all combinations of one or more of the associated listed items.

Although the terms first, second, third, etc. may be used to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Figure 5:
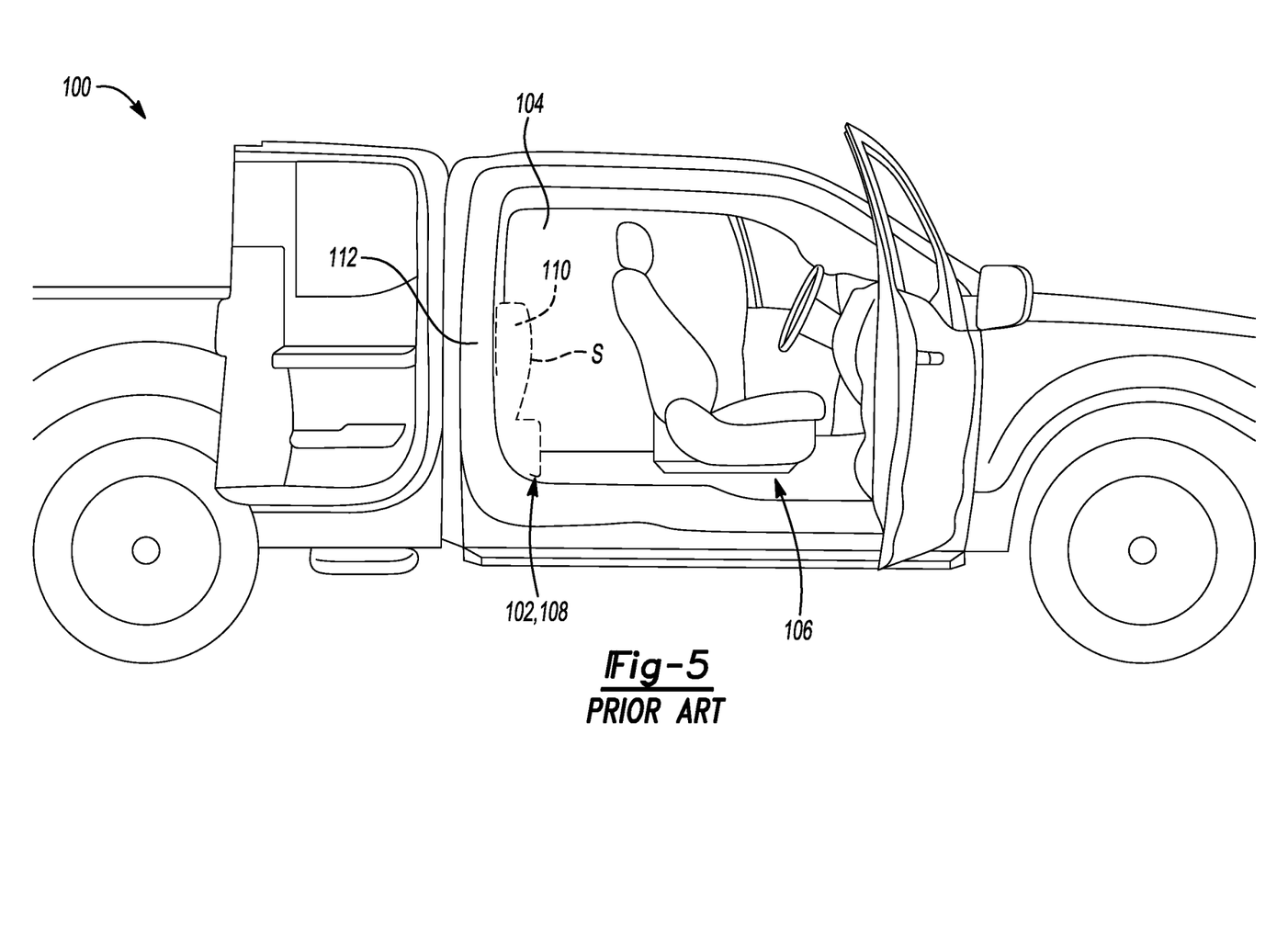
FIG. 5 illustrates a side view of a known vehicle and known seat in a non-use configuration.

FIG. 5 illustrates a known vehicle 100, such as a pickup truck, provided with a known vehicle seat 102 in a stowed or non-use configuration. The vehicle 100 includes a vehicle cabin 104 and a first row of seats 106 and a second row of seats 108. The known vehicle seat 102 is disposed in the second row and includes a cushion 110 that is folded upwards to lie against a back frame or backrest (not illustrated) that may be positioned adjacent to a rear wall of the vehicle cabin 104. The backrest may be disposed behind or covered by a B-pillar 112 that forms a portion of the vehicle cabin 104. Despite the vehicle seat 102 being in the stowed or non-use configuration, seat mounting brackets or risers that attach the cushion 110 to the floor of the vehicle 100 and the cushion 110 occupy or take up a material quantity of space S as represented by the dashed lines.

One disadvantage of the known vehicle seats such as the vehicle seat 102 is the space S occupied by the seat 102 even when the seat is in the non-use configuration. The present disclosure aims to provide a vehicle seat that eliminates or at least reduces the volume of the space S that would otherwise be available for additional articles or cargo.

Referring generally to the figures, a vehicle seat 120 for use in a vehicle 122 is provided. In one or more embodiments, the vehicle 122 may be a pickup truck and the vehicle seat 120 may be a rear seat such as a second-row seat, though the present disclosure may also apply to other types of vehicles (e.g., sedans, vans, sport-utility vehicles) and other types of seats (e.g., first row, third row). The vehicle seat 120 may be configured to move between a use configuration, in which an occupant may be supported by the vehicle seat 120, and a non-use configuration, in which the vehicle seat 120 is stowed to provide additional space for storage within a cabin 124 of the vehicle 122. The vehicle seat 120 may include a backrest 126 and a cushion pan 128. The backrest 126 may be configured to support the occupant's back and the cushion pan 128 may be configured to support the occupant's legs. The backrest 126 may be coupled to a wall, such as a rear wall 130 of the vehicle 122, so that the backrest 126 may translate in a vertical direction from a first position to a second position. When the backrest 126 is in the second position, the backrest 126 may be spaced further apart from a floor of the vehicle 122 than when the backrest 126 is in the first position.

The vehicle 122 may include a floor 132 and a number of walls, such as the rear wall 130, and a roof 138 that may collectively form a vehicle cabin 124. The vehicle seat 120 may include a guide member 134 that may be fixed to the floor 132, the rear wall 130, or both. Alternatively or additionally, the guide member 134 may be fixed to the roof 138 or one or more sidewalls of the vehicle 122. The guide member 134 may define a guideway 136 and the backrest 126, the cushion pan 128, or both may be configured to move along the guideway 136 to change between the use configuration and the non-use configuration. As another example, the guide member 134 may be formed integrally (e.g., one piece) with the rear wall 130 of the vehicle 122.

The cushion pan 128 may include a first end portion 144 and a second end portion 146, the first end portion 144 may be pivotally coupled to the guide member 134, the backrest 126, or both. As an example, the first end portion 144 of the cushion pan 128 may be pivotally coupled to the backrest 126 so that the cushion pan 128 may rotate with respect to the backrest 126 and/or the guide member 134 between a number of positions including a horizontal position (FIG. 1A) and a vertical position (FIG. 1B). When the cushion pan 128 is in the horizontal position, the cushion pan 128 may be arranged substantially parallel to the floor 132 (e.g., use configuration) so that the cushion pan 128 may support an occupant seated in the vehicle seat 120.

Figure 1A:
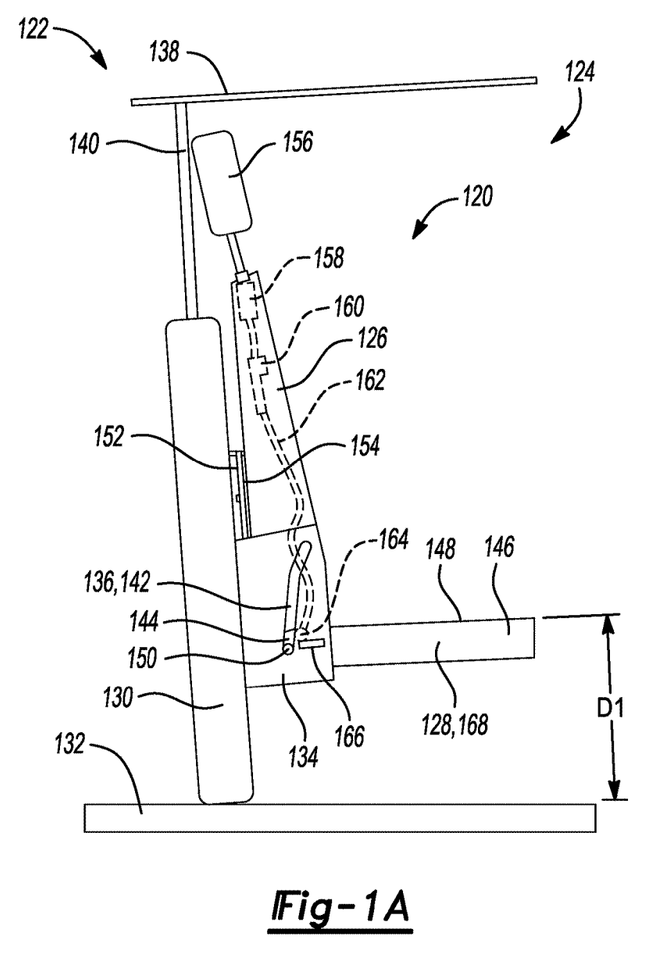
FIG. 1A and FIG. 1B illustrate side-schematic views of an exemplary seat in a use configuration and a non-use configuration, respectively.
Figure 1B:
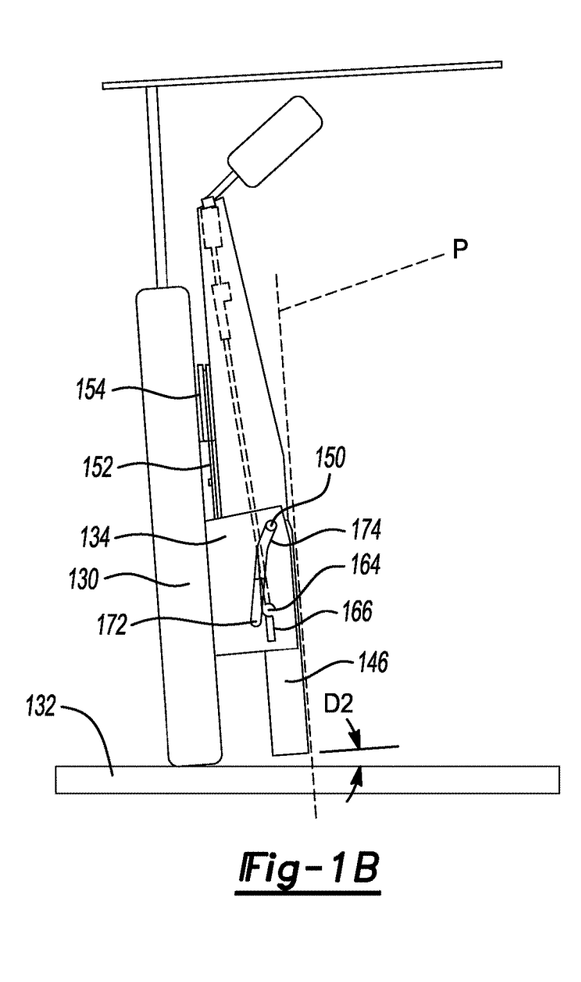

FIG. 1A and FIG. 1B illustrate side-schematic views of the vehicle seat 120 in the use configuration and the non-use configuration, respectively. The vehicle 122 may include the cabin 124 that may be formed by the vehicle floor 132, the roof 138, and one or more walls such as the rear wall 130. In one or more embodiments, a window such as a rear window 140 may extend between the rear wall 130 and the roof 138. The vehicle seat 120 may be disposed in the cabin 124 and may be configured to move between a use position and a non-use position when, for example, additional storage space in the cabin 124 is required.

The seat 120 may include the guide member 134 that may also be referred to as a base member. The guide member 134 may define the guideway 136 that may be configured to guide the backrest 126, the cushion pan 128, or both between the use and non-use configurations. The guide member 134 may be formed by one or more brackets that may be fixed to portions of the cabin 124 (e.g., rear wall 130). In one or more embodiments, the guideway 136 may be formed by a slot 142 that may extend through a thickness of the guide member 134. The guideway 136 or slot 142 may include a first portion 172 and a second portion 174. As an example, the first portion 172 may be positioned closer to the rear wall 130 and the floor 132 than the second portion 174.

A pin 150 may be coupled to the cushion pan 128, the backrest 126, or both and the pin 150 may extend into the slot 142. In one or more embodiments, the pin 150 may be attached to the backrest 126 so that the backrest translates (e.g., does not rotate) in a vertical direction that may be substantially parallel to the rear wall 130. As another example, the backrest 126 may be coupled to the pin 150 so that as the pin 150 moves along the slot 142, the backrest 126 rotates or pivots. The pin 150 may be coupled or attached to the cushion pan 128 so that the cushion pan rotates or pivots as the pin 150 moves along the slot 142.

As an example, when the pin 150 is disposed in or near the first portion 172 of the slot 142, the cushion pan 128 and backrest 126 may be in the use configuration and when the pin is disposed in or near the second portion 174 of the slot 142 the cushion pan 128 and backrest 126 may be in the non-use configuration. Portions of the guideway 136 or slot 142 may be curved to have a substantially arcuate shape. As such, as the pin 150 moves along the arcuate guideway 136 or slot 142 the first end portion 144 of the cushion pan 128 may move in the fore-and-aft direction and the vertical direction (e.g., towards and away from the vehicle floor). The cushion pan 128 may include a top surface 148 that may be arranged substantially parallel to the floor 132 when the seat 120 is in the use position. When the seat 120 is in the non-use position, the top surface 148 of the cushion pan 128 may be positioned substantially parallel to the rear wall 130. Alternatively or additionally, when the seat 120 is in the non-use position, the top surface 148 of the cushion pan 128 may lie in a common plane P with one or more portions of the backrest 126.

The cushion pan 128 may include one or more side panels 168 that may form lateral surfaces of the cushion pan 128. A locking device 166 may be fixed to at least one of the side panels 168 so that as the cushion pan 128 rotates, the locking device 166 rotates as well. The locking device 166 may be configured to engage portions of the guide member 134 so that the position (e.g., use position and non-use position) of the cushion pan 128 is locked.

The seat 120 may include a number of actuation mechanisms that may be configured to move one or more portions of the seat 120 between the use configuration and the non-use configuration. As an example, the backrest 126, the cushion pan 128, or both may be moved (e.g., translate, pivot, or rotate) by a rail assembly. The rail assembly may include a fixed rail 152 and a movable rail 154 that may be configured to move along the fixed rail 152. As an example, the fixed rail 152 may be fixed to the rear wall 130, the guide member 134, or both and the movable rail 154 may be fixed to one or more portions of the backrest 126. The rail assembly may include a spindle and a spindle nut that may be coupled to the fixed rail 152 or the movable rail 154 to carry the movable rail 154 along the fixed rail 152. An example of such a spindle and spindle nut is described in U.S. Pat. No. 8,826,756 which is hereby incorporated by reference in its entirety. In one or more embodiments, the spindle and spindle nut may be self-locking so that when the spindle and/or spindle nut are not actuated (e.g., rotated) the movable rail 154 is fixed and held substantially stationary with respect to the fixed rail 152.

As another example, the rail assembly may be manually actuated so that the movable rail 154 may be unlocked and translated along the fixed rail 152. The rail assembly may include a locking device, such as the locking device disclosed in U.S. Pat. No. 7,980,525, which is hereby incorporated by reference in its entirety.

The seat 120 may include a headrest 156 that may extend from the backrest 126 and provide support to an occupant's head when the occupant is disposed in the seat 120. The headrest 156 may be operatively coupled to a headrest actuation assembly to move the headrest 156 between a use position and a non-use position. As an example, applicant's co-pending application, German Publication No. DE 10 2019 202 375 A1, describes a headrest actuation assembly and is hereby incorporated by reference in its entirety.

The headrest actuation assembly may include a locking device 158 and an actuator device 160 that may be connected by a Bowden cable 162. The locking device 158 may be configured to automatically fold the headrest 156 forward from the use position (FIG. 1A) to the non-use position (FIG. 1B). The headrest 156 may be biased towards the folded-forward position by one or more springs so that upon unlocking the locking device 158, the headrest 156 folds forward. The Bowden cable 162 may be connected to a force transmission element such as a pulley or a cam 164 that may be coupled to the cushion pan 128, the guide member 134, or both. As the cushion pan 128 rotates from the use position to the non-use position, the cam 164 may tension the Bowden cable to actuate the actuator device 160. In response to actuation of the actuator device 160, portions of the Bowden cable extending between the locking device 158 and the actuator device 160 may be tensioned to unlock the locking device 158.

Figure 2:
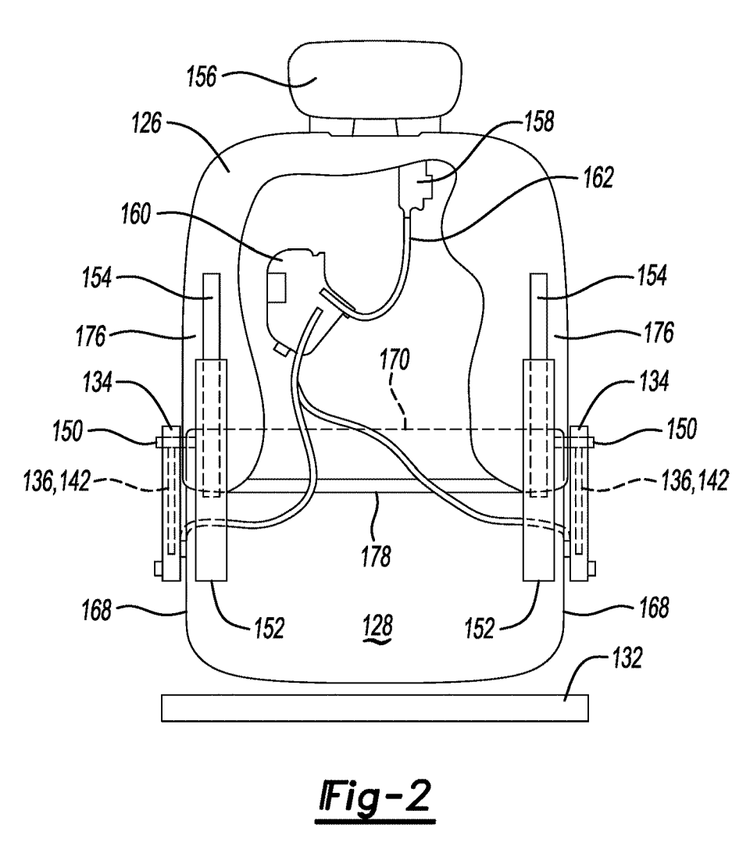
FIG. 2 illustrates a rear schematic view of the seat illustrated in FIG. 1B.

FIG. 2 illustrates a rear schematic view of the seat 120. Portions of external coverings such as trim are removed in this view to show internal features of the backrest (e.g., the locking device 158, Bowden cable 162, and actuator device 160. The vehicle seat 120 may include a pair of guide members 134 each disposed on either side of the backrest 126 and the cushion pan 128. The guide members 134 may be fixed to the rear wall 130 (FIGS. 1A-1B) and may define the guideways 136 or slots 142.

The backrest 126 may include side members 176 that may form lateral portions of the backrest 126 and a bottom transverse member 178 may extend between the side members 176 of the backrest 126. The cushion pan 128 may include a rear cross member 170 that may extend between the side panels 168 of the cushion pan 128. In one or more embodiments, the side panels 168 and the rear cross member 170 may each be disposed between the side members 176 of the backrest 126. The pin 150 or a shaft, such as a driveshaft, may be fixed to the side panels 168 of the cushion pan and the side members 176 of the backrest 126. The pin 150 may extend into the guideway 136 or slot 142 and the pin 150 may be configured to rotate within the guideway 136 or slot 142 as the pin moves along the guideway 136 or slot 142. While two pins 150 are illustrated, one pin or shaft 150 that may extend between each of the guide members 134 may be used, as required.

As mentioned above, the movable rails 154 may be fixed to one or more portions of the backrest 126 so that as the movable rails 154 move away from or towards the floor 132, along the fixed rails 152, the backrest 126 also moves away from away from or towards the floor. When the movable rails 154 are moved to or near the uppermost position, portions of the movable rails 154 may be positioned external to the fixed rails 152. The fixed rails 152 may be fixed directly to a wall of the vehicle cabin 124 (e.g., the rear wall 130) by one or more fasteners or welding as required. Alternatively or additionally, one or more brackets may be disposed between one or more walls of the vehicle cabin 124 and one or more of the fixed rails 152.

Figure 3A:
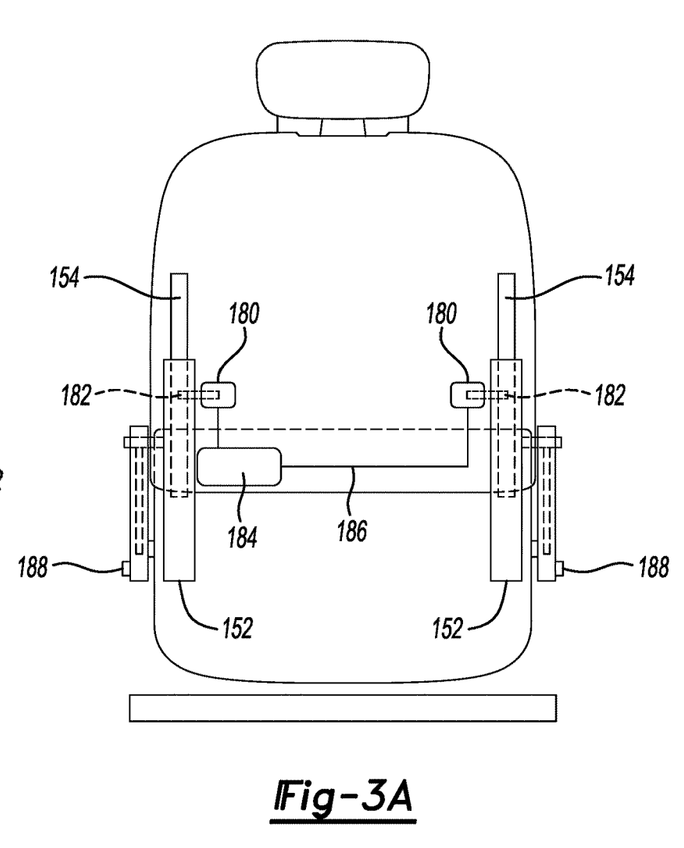
FIG. 3A and FIG. 3B illustrate a rear-schematic view of an exemplary seat in a non-use configuration and a use configuration, respectively.
Figure 3B:
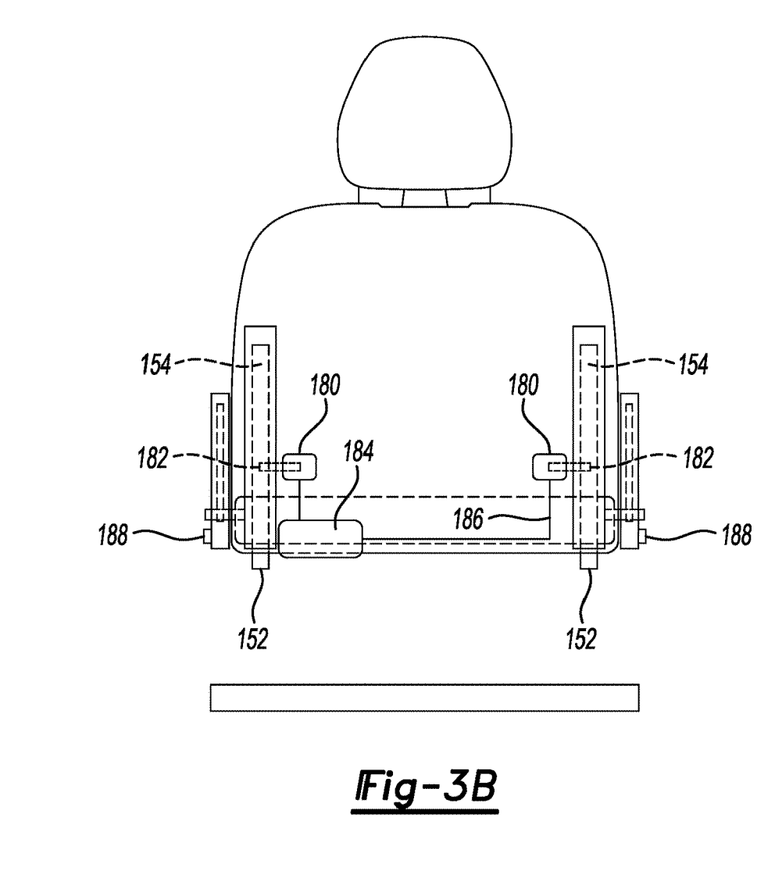

FIG. 3A and FIG. 3B illustrate a rear-schematic view of the seat 120 in a non-use configuration and a use configuration, respectively. In one or more embodiments, the seat 120 may include a number of motors 180 and driveshafts 182 that may be configured to cooperate with each of the motors 180. The motor 180 may be fixed to the fixed rail 152, the movable rail 154, the backrest 126, the cushion pan 128, or some combination thereof. The driveshaft 182 may extend into the movable rail 154 and/or fixed rail 152 and engage the spindle or spindle nut of the rail assemblies to move the movable rail 154.

The motor 180 may be configured to receive signals or communications 186 from an electronic control unit (ECU) or a controller 184. While illustrated as one controller, the controller 184 may be part of a larger control system and may be controlled by various other controllers throughout the vehicle 122, such as a vehicle system controller (VSC). It should therefore be understood that the controller 184 and one or more other controllers can collectively be referred to as a "controller" that controls various actuators in response to signals from various sensors to control functions such as commanding the motor 180 to move the seat 120 between the use position to the non-use position, actuating the locking device 158 and/or the actuator device 160 to move the headrest 156 to the non-use position. The controller 184 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 184 in controlling the seat 120 or the vehicle 122.

As mentioned above, the controller 184 may be configured to command the motor 180 to actuate the seat 120 between the use and non-use configurations. As one example, the controller 184 may receive a signal from a mobile device that may serve as an input for a user to alter the position of the seat 120. As another example, or one or more sensors may be provided and configured to detect a user's desire to change the configuration of the seat 120. As the seat 120 moves from the non-use configuration to the use configuration, the motor 180, driveshaft 182, the controller 184, or some combination thereof, may move along with the movable rail 154, the backrest 126, and/or the cushion pan 128.

In one or more embodiments, the vehicle seat 120 may include one or more attachment members 188 for attaching seatbelts for the vehicle seat 120. As an example, the seatbelts may be a three-point seat belt in which one or more portions of the belts are fixed to one or more walls of the vehicle cabin 124. As another example, the seatbelts may be an integrated all belts to seat (ABTS) design. The attachment members 188 may be formed by a threaded extrusion, weld stud, or weld nut that may be fixed to the guide member 134.

Figure 4:
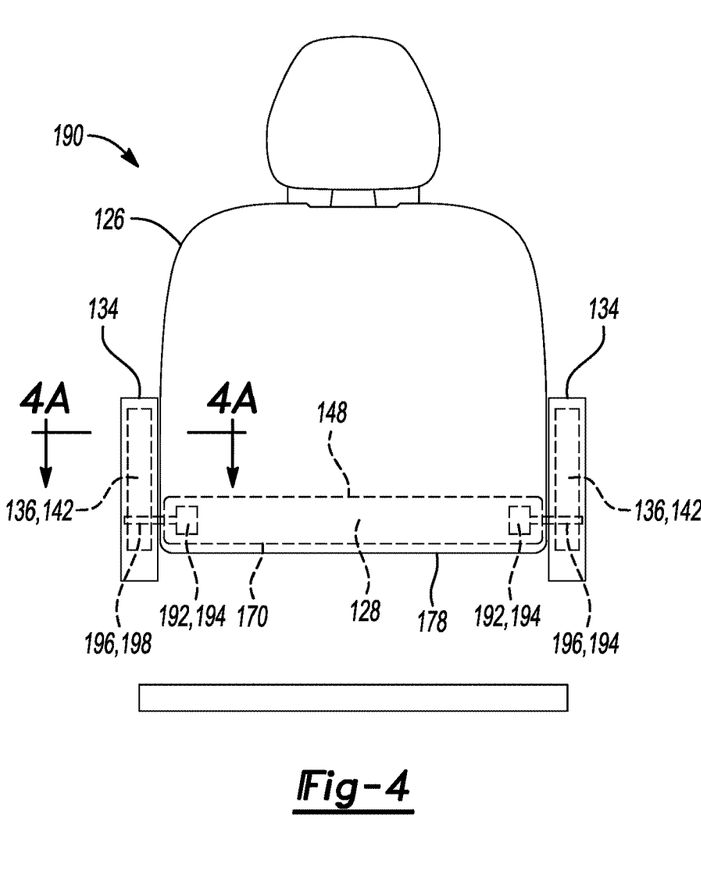
FIG. 4 illustrates a rear-schematic view of another exemplary seat in the use configuration.
Figure 4A:
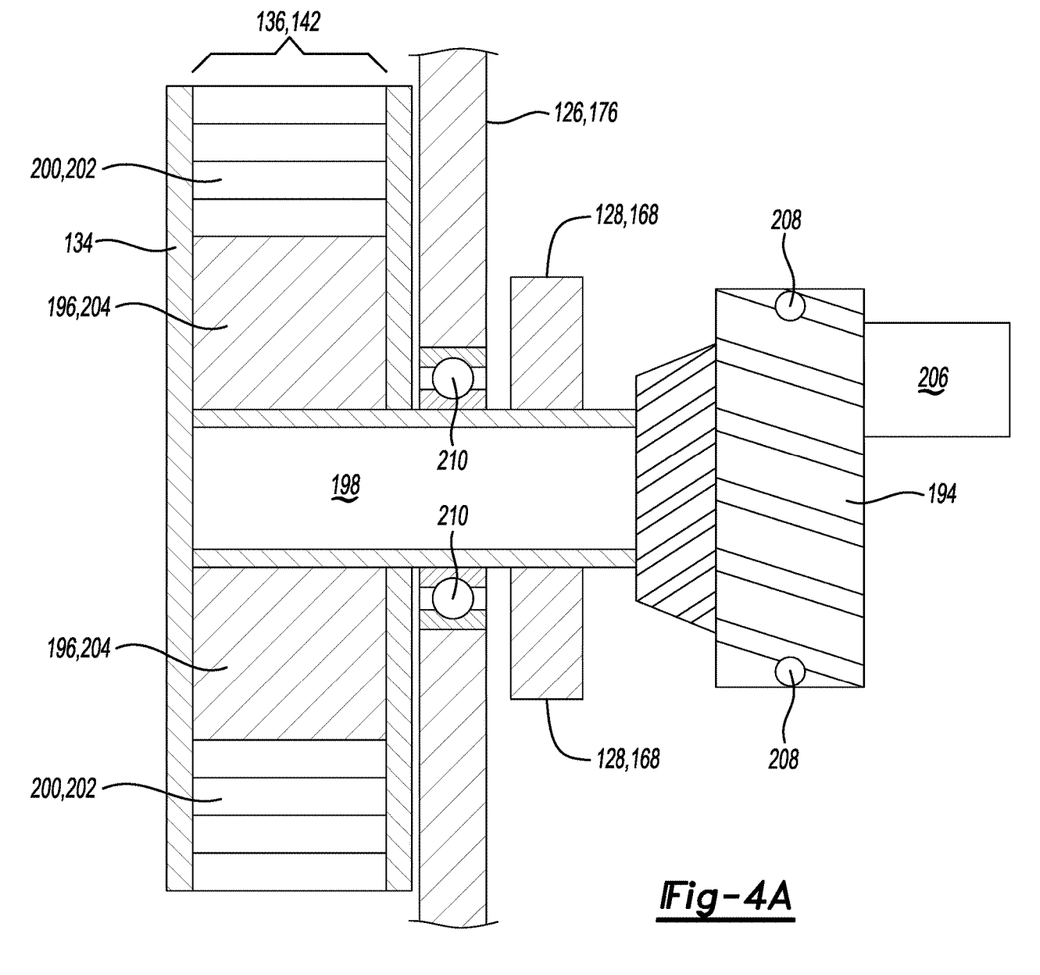
FIG. 4A illustrates a cross-sectional view of a portion of the seat taken along the lines A-A in FIG. 4.

FIG. 4 illustrates a rear-schematic view of another exemplary seat 190 in the use configuration. FIG. 4A illustrates a cross-sectional view of a portion of the seat 190 taken along the lines A-A in FIG. 4. The seat 190 may include a number of components that are identical or structurally similar to the components illustrated and described with reference to FIGS. 1A-3B and those identical or structurally similar components are identified with the same reference numbers. The seat 190 may be configured to move between the use position (FIG. 4) and a non-use position, in which the backrest 126 and cushion pan 128 are disposed in a substantially identical position as described with reference to FIGS. 1A-3B.

In place of or in addition to the rail assemblies, the seat 190 may include one or more pinion drives 192 that may be arranged to move the backrest 126 and the cushion pan 128 between the use and non-use configurations. In embodiments that include one pinion drive 192, the side of the seat 190 opposite the side where the pinion drive 192 is located, may include a guide or locating shaft that may form a slave side of the seat 190. The pinion drive 192 may be substantially similar to adjustment drive disclosed in U.S. Pat. No. 9,421,891 though other configurations of adjustment drives may be used as required. The pinion drive 192 may include a gearbox assembly 194 that may be coupled to a motor 206 and a driveshaft 198. The driveshaft 198 may extend through portions of the cushion pan 128, the backrest 126, and terminate within the guideway 136 or slot 142.

The guideway 136 or slot 142 may include a rack 200 provided with a number of teeth 202. A pinion 196 provided with a number of pinion teeth 204 may extend from the driveshaft 198 and as the driveshaft 198 rotates, the teeth 204 of the pinion 196 may engage the teeth 202 of the rack 200 so that pinion drive 192 moves with respect to the guideway 136 or the slot 142. One or more portions of the pinion drive 192, such as the gearbox assembly 194 may include one or more attachment members 208 that may be configured to receive one or more fasteners to fix the pinion drive 192 to portions of the seat 190.

In one or more embodiments, the cushion pan 128, such as the side panel 168 may be fixed to one or more portions of the driveshaft 198, such as the portion disposed between the backrest 126 and the gearbox assembly 194. The side panel 168 of the cushion pan 128 may be attached to the driveshaft 198 by a weld or one or more fasteners (e.g., clip, snap-ring, bolt, screw) so that the cushion pan 128 is rotatable or configured to rotate as the cushion pan moves (e.g., rotates, pivots) between the horizontal position to the vertical position. The backrest 126 may be coupled to a portion of the pinion drive 192, such as the driveshaft 198, so that the driveshaft 198 may rotate with respect to the backrest 126 and the pinion drive 192 may carry the backrest 126 towards and away from the floor 132 (FIG. 2) and between the use and non-use configurations. In one or more embodiments, a rotational member or coupling, such as a bushing or bearing 210 may be disposed between the driveshaft 198 and the backrest 126.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

PARTS LIST 100 vehicle
102 vehicle seat
102 seat
104 vehicle cabin
106 seats
108 seats
110 cushion
112 B-pillar 120 vehicle seat
122 vehicle
124 cabin
126 backrest
128 cushion pan
130 rear wall
132 floor
134 guide member
136 guideway
138 roof
140 glass
142 slot
144 first end portion cushion
146 second end portion cushion
148 top surface cushion pan
150 pin or shaft
152 fixed rail
154 movable rail
156 headrest
158 locking device
160 actuator device
162 Bowden cable
164 cam
166 locking device
168 side panel
170 rear member of cushion pan
172 first portion of slot
174 second portion of slot
176 side member backrest
178 bottom transverse member
180 motor
182 driveshaft
184 controller
186 communication
188 attachment members—seatbelts
190 seat with pinion drive
192 pinion drive
194 gearbox
196 pinion
198 driveshaft
200 rack
202 teeth of rack
204 teeth of pinion
206 motor
208 attachment members—gearbox
210 bearing

What is claimed is:

1. A seat for use in a vehicle, the seat configured to move between a use configuration and a non-use configuration, the seat comprising:
a guide member fixed to at least one of a floor of the vehicle or a wall of the vehicle, the guide member defining a guideway;
a backrest configured to translate along the guideway from a first position to a second position so that the backrest moves away from the floor of the vehicle; and
a cushion pan including a first end portion and a second end portion, the cushion pan configured to rotate between,
a horizontal position, in which the second end portion is spaced apart from the floor by a first distance, and
a vertical position, in which the second end portion is spaced apart from the floor by a second distance, wherein the second distance is less than the first distance, and
wherein the first end portion is pivotally coupled to the backrest so that as the backrest moves from the first position to the second position, the cushion pan rotates from the horizontal position to the vertical position to move the seat from the use configuration to the non-use configuration.

2. The seat of claim 1, wherein the backrest and the first end portion of the cushion pan are coupled to one another so that the first end portion of the cushion pan moves away from the floor as the backrest moves away from the floor.

3. The seat of claim 1, further comprising:
a pin fixed to the backrest, the cushion pan rotatably fixed to the pin, wherein the guideway is formed by a slot and the pin extends into the slot so that the pin moves within the slot as the backrest translates between the first and second positions.

4. The seat of claim 1, wherein the guideway has a substantially arcuate shape.

5. The seat of claim 3, wherein the slot includes a first end and a second end, the first end closer to the wall than the second end, and the pin moves towards the second end of the slot as the backrest translates from the first position to the second position.

6. The seat of claim 1, further comprising:
a fixed rail configured to be fixed to the wall of the vehicle; and
a movable rail fixed to the backrest and configured to translate along the fixed rail to move the backrest between the first and second positions.

7. The seat of claim 6, further comprising:
a motor fixed to the fixed rail or the movable rail; and
a driveshaft operatively coupled to the movable rail, wherein the motor is configured to drive the driveshaft to translate the movable rail along the fixed rail.

8. The seat of claim 1, further comprising:
a headrest extending from the backrest and configured to move between a use position and a non-use position; and
a headrest adjustment assembly operatively coupled to the cushion pan and configured to move or permit movement of the headrest from the use position to the non-use position.

9. The seat of claim 8, wherein the headrest adjustment assembly includes a cam fixed to the cushion pan and a wire operatively connected to the headrest, wherein the cam is configured to engage and tighten the wire to move the headrest from the use position to the non-use position.

10. A seat for use in a vehicle, the seat configured to move between a use configuration and a non-use configuration, the seat comprising:
a guide member fixed to at least one of a floor of the vehicle or a wall of the vehicle, the guide member defining a guideway;
a backrest configured to translate with respect to the guideway in a vertical direction, extending away from a floor of the vehicle, from a first position to a second position;
a cushion pan including a top surface and pivotally coupled to at least one of the backrest and the guide member, the cushion pan configured to pivot from a use position, in which the top surface is arranged to support an occupant seated in the seat, and a non-use position;
a gearbox assembly configured to move with the backrest as the backrest translates between the first position and the second position;
a driveshaft extending from the gearbox assembly; and
a pinion extending from the driveshaft, wherein the guide member is formed by a rack provided with a number of teeth, and the pinion is configured to engage the number of teeth, wherein the gearbox assembly is configured to be actuated to rotate the driveshaft and pinion in a rotational direction to translate the backrest from the first position to the second position.

11. The seat of claim 10, wherein the backrest is coupled to the driveshaft so that the driveshaft is rotatable with respect to the backrest.

12. The seat of claim 11, further comprising:
a bearing disposed between the driveshaft and the backrest, wherein the bearing is configured to permit rotation of the driveshaft with respect to the backrest.

13. The seat of claim 10, wherein the cushion pan is fixed to the driveshaft and configured to rotate with the driveshaft.

14. The seat of claim 10, wherein when the cushion pan is in the non-use position, the top surface of the cushion pan and at least a portion of the backrest lie in a common plane.

15. A seat for use in a vehicle, the vehicle including a cabin formed by cabin wall and a floor, the seat comprising:
a base member spaced apart from the floor and fixed to the cabin wall;
a backrest coupled to the base member and configured to move with respect to the base member in a number of directions from a use position to a non-use position; and
a cushion pan including a proximal end and distal end, the proximal end coupled to the backrest and configured to move with the backrest so that the distal end of the cushion pan rotates towards the floor as the backrest moves from the use position to the non-use position.

16. The seat of claim 15, wherein the number of directions includes a vertical direction, the vertical direction extending substantially orthogonal to the floor of the vehicle.

17. The seat of claim 15, wherein the number of directions includes a fore-and-aft direction, the fore-and-aft direction extending substantially parallel to the floor of the vehicle.

18. The seat of claim 15, further comprising:
a driveshaft coupled to the backrest and the cushion pan, wherein the base member defines a slot and the driveshaft is configured to move within the slot to move the backrest from the use position to the non-use position.

19. The seat of claim 15, wherein the backrest includes a side member, and the cushion pan includes a side panel, wherein at least a portion of the side panel is disposed between a portion of the base member and a portion of the side member.

* * * * *